April 13, 1943.   S. R. THOMAS   2,316,468
BEARING ASSEMBLY
Filed July 26, 1941
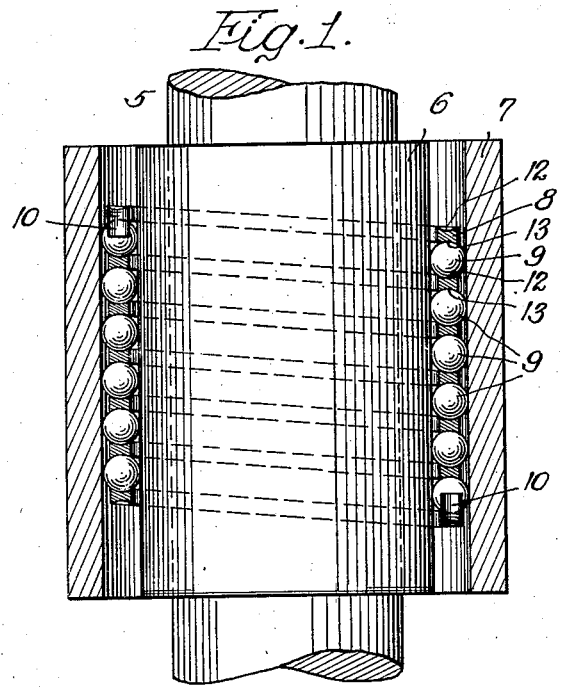
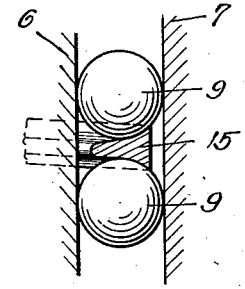
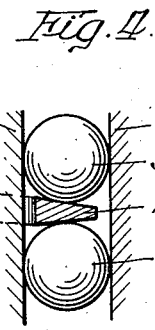
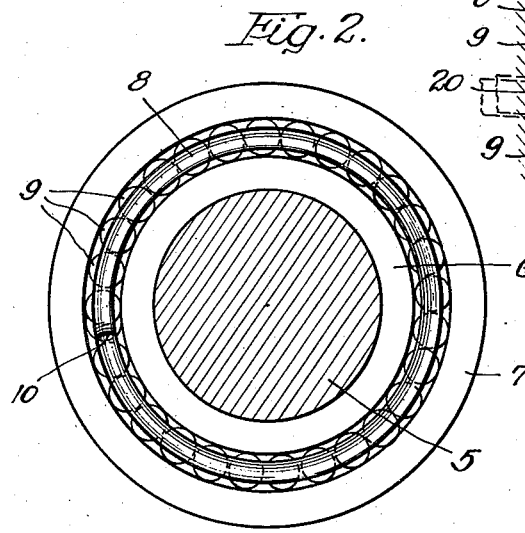
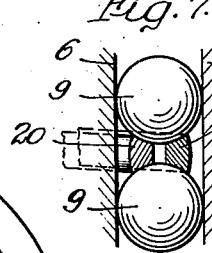
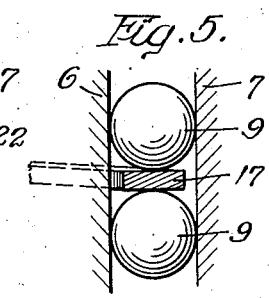
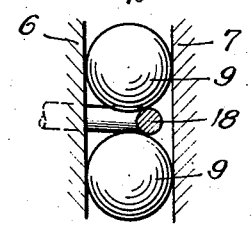
INVENTOR.
Stanley R. Thomas.
Walter E. Schirmer
BY
Atty.

Patented Apr. 13, 1943

2,316,468

UNITED STATES PATENT OFFICE 2,316,468

BEARING ASSEMBLY

Stanley R. Thomas, Lyons, Mich., assignor to Bantam Bearings Corporation, South Bend, Ind., a corporation of Indiana Application July 26, 1941, Serial No. 404,190

11 Claims. (Cl. 308—6)

This invention relates to bearing assemblies, and more particularly is directed to a bearing assembly for a reciprocating and rotating bearing.

Formerly, in the manufacture of bearings for use in connection with spindles which had both reciprocating and rotative movement relative the bearing support, a preformed sleeve type cage member was employed which was provided with a plurality of staggered openings in which ball members were disposed to provide the bearing support. Such a construction had certain disadvantages in that the capacity of the bearing was limited due to the necessity of providing sufficient material between the openings which received the balls to provide rigidity for the cage, which in turn limited the number of balls that could be employed, and consequently limited the load capacity of the bearing. In addition, a cage formed in this manner was very expensive and required accurate machine operations.

The present construction overcomes these disadvantages and provides a reciprocating bearing assembly which is capable of containing a greatly increased number of balls for a given size of bearing, which in turn greatly increases the capacity of the bearing. In addition, the cage construction herein disclosed is appreciably less expensive than the former types of cages previously used. Also, a distinct advantage is obtained in that the amount of machining necessary is reduced to a minimum and the manufacturing tolerances can be increased without in any way affecting the desired operating characteristics of the bearing.

As a primary object of the present invention, I provide a bearing construction in which the cage is formed as a helical spring member having separated coils between which are disposed the balls. Thus the balls are arranged in a helical formation throughout the extent of the cage and a full complement of balls can be provided, producing a continuous helical series of balls from one end of the cage to the other. This in turn distributes the surface contact of the balls over the entire surface of the bearing races, minimizing localized wear, and thus prolonging the life of the bearing assembly. In addition, by using a full complement of balls retained in a coil spring, a greatly increased number of balls can be employed in a given size of bearing, which, of course, increases the capacity of the bearing so that I find with the present construction the capacity of a bearing is increased approximately 100% over the previous type of construction.

While the spring member employed in the present construction can be of any desired section, I have found that the present invention adapts itself well to employing a spring which will act to retain the balls against displacement relative to either one or the other of the bearing races, or in which the cage and balls can be formed as a self-contained unit and held against displacement independently of either of the races, facilitating greatly the handling and installation of assemblies of this type.

Other objects and advantages of the present invention will appear more fully from the following detailed description which, taken in conjunction with the accompanying drawing will disclose to those skilled in the art the particular construction and operation of the preferred form of the present invention.

In the drawing:

Figure 1 is a sectional view of a bearing assembly embodying the present invention;

Figure 2 is an end elevational view of the construction shown in Figure 1;

Figure 3 is a detailed sectional view showing a modification of the cage structure;

Figure 4 is a corresponding view showing another modified form of cage construction;

Figure 5 is a sectional view illustrating a still further modification of the cage structure;

Figure 6 is a sectional view showing still another modification of the cage structure; and Figure 7 is a sectional view showing the use of a double spring member for the retaining cage.

Referring now in detail to the drawing, I have indicated at 5 a spindle shaft or the like which is subject to reciprocation, and which also has relative rotation with respect to a support or journal.

Formed either as a part of the shaft 5 or as a sleeve pressed thereover is a radially enlarged annular race member 6 having an external cylindrical surface forming the inner race of the bearing assembly for the shaft.

Coaxial with the race member 6 and radially spaced thereabout is an outer race member which, in this form of the invention comprises a sleeve 7 overlying the race member 6 and having an internal cylindrical surface forming the outer race-way for the bearing assembly. Disposed between the races 6 and 7 is the bearing assembly comprising the cage member 8 and a plurality of anti-friction ball members 9. The cage member 8 consists of a helically wound spring which has the coils spaced axially, and which is provided with the axially inturned ends 10 at the opposite ends of the spring. The spring 8 in this form of the invention has a cross section of double concave form providing the recesses 12 and 13 in the radial faces of adjacent coils, these recesses forming annular grooves for receiving the balls 9 and maintaining the balls against radial displacement out of the cage 8. The inturned ends 10 form stops for preventing circumferential displacement of the balls out of either end of the cage, thereby providing a self-contained cage and bearing construction which can be handled and inserted into place without danger of displacement of the ball members. The inherent spring characteristics of the cage holds the balls in position, and the cage itself is of a thickness such as to be disposed within the space between the races 6 and 7 out of contact with either race.

With such a construction it will be apparent that a full complement of balls can be retained in a continuous spiral or helix from one end of the cage to the other with no spacing between the respective balls in a spiral direction.

Consequently, it will be apparent immediately that a greatly increased number of balls can be retained in a cage of this type, as compared with a solid sleeve which is punched to receive balls in staggered relation since in such case the balls are separated in every direction by a certain amount of metal in the cage With this construction it will be apparent that any relative axial movement of the race 6 with respect to the race 7 will be readily accommodated by the bearing assembly comprising the cage 8 and balls 9, and that at the same time this bearing assembly will accommodate relative rotation of the races and greatly increase the load bearing capacity of the assembly due to the increased number of balls.

The cage member is, of course, considerably less expensive to form than a sleeve type cage since any standard type of coil spring can be employed for this purpose, and the stock from which the spring is formed can be provided with the grooves 12 and 13 prior to rolling the stock into the spring shape.

In Figure 3 I have disclosed a modified construction in which the spring cage 15 is so formed as to provide for retaining the balls in position on the inner race 6 when the outer race 7 is removed. In this construction the cross-sectional area of the individual spring coils increases radially outwardly, forming an abutment beyond the median pitch diameter of the balls, preventing their movement radially outwardly, and the inherent characteristic of the spring coil will thereby hold the balls in contact with the inner sleeve or race when the outer race is removed.

In Figure 4 a modified construction is shown in which the race is formed so as to hold the balls in position on the inner annular surface of the outer race 7 when removed from the inner race 6. The coils 16 in this form of the invention are of a trapezoidal sectional area that increases from the outer diameter of the coil to the inner diameter thereof to form an abutment holding the balls against radial inward displacement.

Figure 5 shows a conventional type of coil spring 17 which is of generally rectangular section, and in which no retaining feature is provided since the balls are free to move radially in either direction upon removal of one or the other of the races 6 or 7. This is a very cheap form of construction utilizing a conventional type of coil spring of rectangular construction.

In Figure 6 I have shown a retainer formed of a circular wire spring 18, which may be of a diameter slightly greater than the pitch diameter of the balls 9 so as to hold the balls in position against radial displacement of the sleeve from the race 6 when the race 7 is removed. Similarly, if the spring 18 is made of a smaller diameter than the mean pitch diameter of the balls, it will retain the balls in contact with the race 7 when the race 6 is removed. It is to be understood that in each of these forms of the invention the ends of the spring retainer are turned at right angles in an axial direction to form stops for preventing circumferential displacement of the balls at either end of the spring so that a continuous spiral full complement of balls may be retained in the cage.

In Figure 7 I have disclosed a retaining cage construction which accomplishes the same purpose as that shown in Figures 1 and 2, in providing a self-contained assembly wherein the balls will be retained in the cage independently of the races 6 and 7.

In this form of the invention I employ an inner helically coiled spring member 20 of substantially keystone section with the small base of the section disposed at the radial outer periphery of the coil. A second helically coiled spring member 22 complementary to the spring member 20 and having its coils in helical alinement therewith is provided. The coil 22 is also of keystone form but is reversed so that the small base of the coil is at the inner periphery of the coil. Consequently, the coils 20 and 22 form a retainer providing abutments preventing radial displacement of the balls either inwardly or outwardly since the balls fit into the concave recesses formed adjacent the facing edges of the complementary coils. With this construction, the retainer and balls may be removed and the balls will be retained against displacement from the retainer independently of either of the races 6 or 7 so that the balls and retainer can be handled as a unit and slipped into position readily. This facilitates the assembly of the bearing and insures that the balls will be in proper position without requiring individual insertion of the balls into the retainer as the retainer is moved axially between the races.

It is therefore believed apparent that with this construction I have provided a novel type of inexpensive retainer for reciprocating bearings, which has distinct advantages in providing for the use of a greatly increased number of balls in a bearing of predetermined size, and thereby greatly increasing the capacity of such a bearing. In addition, the balls can be readily removed from the retainer whenever desired by merely expanding the same to increase the axial space of the coils, which will allow the balls to drop therethrough.

It will also be apparent that with such a construction the bearing has the inherent capacity of adjusting itself within reasonable limits to the diameter required, since the coil may be opened up or slightly closed by expansion or contraction of the spring retainer.

I am aware that various changes may be made in certain details of the present construction, and I therefore do not intend to be limited except as defined by the scope and spirit of the appended claims.

I claim:

1. A rotating and reciprocating bearing comprising an inner bearing member adapted to both rotate and reciprocate, said member having an annular cylindrical bearing surface, an outer member having an internal cylindrical bearing surface spaced radially about said inner member, a helically coiled retaining member intermediate said members and out of contact therewith, and a plurality of ball bearings retained between contiguous coils of said retaining member forming an anti-friction bearing between said members.

2. Bearing means comprising an inner race and an outer race having coaxially radially spaced cylindrical bearing surfaces, said races having relative rotative and axial movement, a coiled retaining member interposed between said surfaces and out of contact therewith, and a plurality of balls retained in a continuous helix between adjacent coils of said member in bearing engagement between said races.

3. The bearing means of claim 2 further characterized in that said retaining member has inturned ends forming stops for preventing circumferential displacement of said balls.

4. The bearing means of claim 2 wherein said retaining member is of trapezoidal section to retain said balls in position relative to one race when the other race is removed.

5. The bearing means of claim 2 wherein said retaining member is of double concave section to retain said balls against displacement therefrom independently of said races.

6. The bearing means of claim 2 wherein said retaining member has an effective increase in section radially offset from the center of said balls to retain said balls against displacement relative to one race when the other race is removed.

7. A bearing assembly comprising inner and outer cylindrical race members having relative rotative and axial movement, a helically coiled spring retainer between said races and out of contact therewith, and a full complement of balls between said race members extending helically from one end of said retainer to the other end between contiguous coils thereof.

8. A bearing assembly comprising inner and outer cylindrical race members having relative rotative and axial movement, a helically coiled spring retainer between said races, and a full complement of balls between said race members extending helically from one end of said retainer to the other end between contiguous coils thereof, said retainer having the ends thereof turned axially inwardly to prevent displacement of said balls circumferentially of said retainer.

9. A bearing assembly comprising inner and outer cylindrical race members having relative rotative and axial movement, a helically coiled spring retainer between said races, and a full complement of balls between said race members extending helically from one end of said retainer to the other end between contiguous coils thereof, said retainer being of double concave section to form facing retaining grooves in adjacent coils for preventing radial displacement of said balls from said retainer.

10. A bearing assembly comprising inner and outer cylindrical race members having relative rotative and axial movement, a helically coiled spring retainer between said races, and a full complement of balls between said race members extending helically from one end of said retainer to the other end between contiguous coils thereof, said retainer being of a section such as to confine said balls against displacement relative to one race member when the other race member is removed.

11. A ball retaining member for a bearing assembly including inner and outer cylindrical race members having relative rotative and axial movement, comprising a helically coiled spring member of appreciable axial length having uniformly spaced coils for receiving therebetween a full complement of continuously helically arranged balls, the ends of said spring being turned in to form stops for the opposite ends of said complement of balls.

STANLEY R. THOMAS.